(12) United States Patent
Ramteke et al.

(10) Patent No.: US 10,756,950 B2
(45) Date of Patent: Aug. 25, 2020

(54) IDENTIFYING A POTENTIALLY ERRONEOUS DEVICE IN AN INTERNET OF THINGS (IOT) NETWORK

(71) Applicant: Hewlett Packard Enterprise Development LP, Houston, TX (US)

(72) Inventors: Venkatesh Raman Ramteke, Bangalore (IN); Shiva Prakash Suragi Math, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 265 days.

(21) Appl. No.: 15/849,112

(22) Filed: Dec. 20, 2017

(65) Prior Publication Data

US 2018/0191553 A1   Jul. 5, 2018

(30) Foreign Application Priority Data

Jan. 5, 2017   (IN) .............................. 2017/41000529

(51) Int. Cl.
G06F 15/16 (2006.01)
H04L 12/24 (2006.01)
H04L 12/26 (2006.01)

(52) U.S. Cl.
CPC ........ *H04L 41/064* (2013.01); *H04L 41/0681* (2013.01); *H04L 41/0686* (2013.01); *H04L 43/065* (2013.01); *H04L 43/067* (2013.01); *H04L 43/0823* (2013.01)

(58) Field of Classification Search
CPC .............. H04L 41/064; H04L 41/0681; H04L 41/0686; H04L 43/065; H04L 43/067; H04L 43/0823
See application file for complete search history.

(56) References Cited

U.S. PATENT DOCUMENTS 9,026,840 B1 * 5/2015 Kim ...................... G06F 21/552
714/4.3
9,756,674 B2 * 9/2017 Noh ....................... H04W 4/14
(Continued)

FOREIGN PATENT DOCUMENTS

WO       20151112112 A1    7/2015
WO       WO-16137848 A1    9/2016

OTHER PUBLICATIONS

"MQTT Essentials Part 2: Publish & Subscribe", available online at <http://www.hivemq.com/blog/mqtt-essentials-part2-publish-subscribe>, Jan. 19, 2015, 21 pages.
(Continued)

*Primary Examiner* — Moustafa M Meky
*Assistant Examiner* — Thorne E Waugh
(74) *Attorney, Agent, or Firm* — Hewlett Packard Enterprise Patent Department

(57) ABSTRACT

Examples described relate to identifying a potentially erroneous device in an IoT network. In an example, data from a device in an IoT network. The data may be analyzed against a classification of previous data from the plurality of devices, wherein the classification classifies the previous data as one of an erroneous data, a potentially erroneous data, or a normal data. If the data from the device represents the erroneous data, the device may be included in a set of potentially erroneous devices. A cluster of the device may be determined in a cluster classification. If the device belongs to the erroneous cluster in the cluster classification, associated devices in the erroneous cluster may be added to the set of potentially erroneous devices. If a threshold amount of devices in the set of potentially erroneous devices is higher than a pre-defined value, a notification may be generated.

19 Claims, 6 Drawing Sheets

(56) References Cited

U.S. PATENT DOCUMENTS

| | | | |
|---|---|---|---|
| 9,781,095 B2* | 10/2017 | Cheng | H04L 63/08 |
| 9,917,860 B2* | 3/2018 | Senanayake | H04L 63/1416 |
| 10,250,641 B2* | 4/2019 | Porras | H04L 63/20 |
| 10,298,996 B2* | 5/2019 | Rahman | H04L 41/0893 |
| 10,333,905 B2* | 6/2019 | Leon | H04L 63/06 |
| 2010/0199352 A1* | 8/2010 | Hill | G06F 21/577 726/25 |
| 2014/0129164 A1* | 5/2014 | Gorbold | G01R 31/3835 702/63 |
| 2014/0244836 A1* | 8/2014 | Goel | H04L 12/2827 709/224 |
| 2015/0199010 A1 | 7/2015 | Coleman et al. | |
| 2017/0006135 A1* | 1/2017 | Siebel | G06F 8/10 |
| 2017/0011298 A1* | 1/2017 | Pal | G06N 5/04 |
| 2017/0149937 A1* | 5/2017 | Ren | H04W 4/18 |
| 2017/0180380 A1* | 6/2017 | Bagasra | H04L 63/101 |
| 2018/0054655 A1* | 2/2018 | Rahman | H04L 41/0893 |
| 2018/0176663 A1* | 6/2018 | Damaggio | H04Q 9/00 |
| 2018/0285234 A1* | 10/2018 | Degaonkar | H04L 41/069 |
| 2018/0288209 A1* | 10/2018 | Kim | H04L 63/0853 |
| 2019/0132205 A1* | 5/2019 | Du | H04L 41/069 |
| 2019/0296967 A1* | 9/2019 | Yang | H04L 41/0893 |

OTHER PUBLICATIONS

Nagois, available online at <https://web.archive.org/web/20171203124536/https://www.nagios.org/>, Dec. 3, 2017, 6 pages.

Ntop, available online at <https://web.archive.org/web/20160906063642/http://www.ntop.org/>, Sep. 6, 2017, 3 pages.

Wikipedia, "Butterfly effect", available online at <https://en.wikipedia.org/w/index.php?title=Butterfly_effect&oldid=816049910>, Dec. 18, 2017, 8 pages.

Wikipedia, "Naive Bayes classifier", available online at <https://en.wikipedia.org/w/index.php?title=Naive_Bayes_classifier&oldid=814713460>, Dec. 10, 2017, 10 pages.

Zenoss, available online at <https://web.archive.org/web/20180320012421/http://www.zenoss.com/company>, Mar. 20, 2018, 4 pages.

Bueno, C., "IoT Butterfly Effects Waiting to Happen," (Web Page), Dec. 15, 2015, 5 pages, available at https://icrunchdata.com/iot-butterfly-effects-waiting-to-happen/#.

Burnham, J.D., "The Butterfly Effect and Predicting the Future of Data Storage and Governance," (Web Page), Oct. 15, 2015, 9 pages, available at http://druva.com/blog/the-butterfly-effect-and-predicting-the-future-of-data-storage-and-governance/.

Earley, S., "Analytics, Machine Learning, and the Internet of Things," (Web Page), Jun. 7, 2015, 18 pages, available at https://www.infoq.com/articles/analytics-machine-learning-and-the-internet-of-things.

Kobielus, J., "Internet of Things May Disrupt Predictive Analytics in Big Data Clouds," (Web Page), Jul. 3, 2013, 3 pages, available at http://www.dataversity.net/internet-of-things-may-disrupt-predictive-analytics-in-big-data-clouds/.

* cited by examiner

| | #Errorless ... | #Error ... | #Errorless ... | #Errorless ... |
|---|---|---|---|---|
| T0 | T1  T2  T3 | T4  T5  T6 | T7 | T8  T9 |

202 — "Temperature":120 ... "humidity":50
204 — "Temperature":90 ...

IDENTIFYING A POTENTIALLY ERRONEOUS DEVICE IN AN INTERNET OF THINGS (IOT) NETWORK

BACKGROUND

The Internet of Things (IoT) may be defined as a system of devices, animals or people that are provided with unique identifiers that allow them to transfer data over a network. These objects may be embedded with sensors that enable these objects to collect and exchange data.

BRIEF DESCRIPTION OF THE DRAWINGS

For a better understanding of the solution, examples will now be described, purely by way of example, with reference to the accompanying drawings, in which:

FIG. 2 illustrates an example time slicing of data into a plurality of time slots;

DETAILED DESCRIPTION

In the Internet of Things, "things" may refer to a wide variety of devices such as heart monitoring implants, biochip transponders on farm animals, automobiles with built-in sensors, smart lights, and smart thermostat systems that may allow remote monitoring. Each "thing" may be assigned a unique identifier (for example, an IP address) and provided with the ability to collect and exchange data over a network.

It is expected that the Internet of Things may grow to include billions of devices in the near future. Considering the growth prospects, it may be challenging to determine how a change in a device state in conjunction with dynamic location of the device may lead to a cascading effect in an IoT network. An inconsistent state or failure in a hierarchy of devices in an IoT may spawn a butterfly effect breakdown across an entire device set. For example, oil companies may deploy a mesh of sensors to detect leakage and tampering in oil pipelines. An inconsistent behavior of a sensor or a message broker relaying sensor information from a pipeline may trigger invalid alarm sequences across the pipeline that may result into halting of operations.

To address these technical challenges, the present disclosure describes various examples for identifying a potentially erroneous device in an Internet of Things (IoT) network. In an example, data from a device in an IoT network comprising of plurality of devices may be received. The data may be analyzed against a classification classifies the previous data as one of an erroneous data, a potentially erroneous data, or a normal data. In response to a determination that the data from the device represents the erroneous data, the device may be included in a set of potentially erroneous devices. Further, a cluster of the device may be determined in a cluster classification that correlates devices in the plurality of devices based on respective geographical locations of the devices and respective classification of previous data from the devices, wherein the cluster classification classifies the devices into one of an erroneous cluster, a potentially erroneous cluster, or a normal cluster. In response to a determination that the device belongs to the erroneous cluster in the cluster classification, associated devices in the erroneous cluster may be added to the set of potentially erroneous devices. Further, in response to a determination that a threshold amount of devices in the set of potentially erroneous devices is higher than a pre-defined value, a notification to this affect may be generated in the IoT network.

Figure 1:
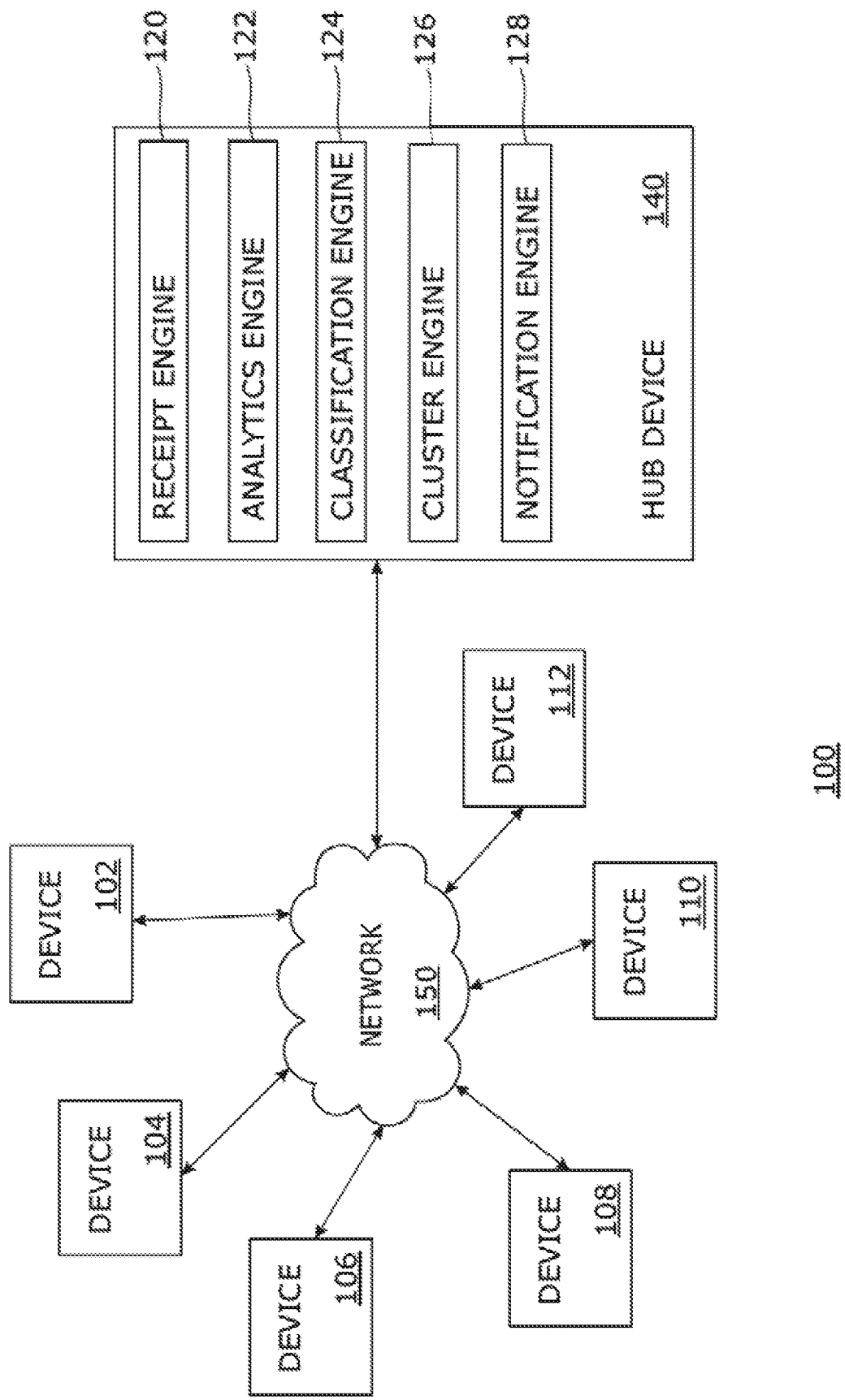
FIG. 1 is block diagram of an example computing environment for identifying a potentially erroneous device in an Internet of Things (IoT) network.

FIG. 1 is a block diagram of an example computing environment 100 for identifying a potentially erroneous device in an Internet of Things (IoT) network. In an example, computing environment 100 may include devices 102, 104, 106, 108, 110, and 112, and hub device 140. Although six devices are shown in FIG. 1, other examples of this disclosure may include more or less than six devices. In an example, computing environment 100 may include hundreds or thousands of such devices. In an example, devices 102, 104, 106, 108, 110, and 112 may be referred to as "IoT devices".

In an example, devices 102, 104, 106, 108, 110, and 112 may represent any type of system capable of executing machine-readable instructions. For example, devices 102, 104, 106, 108, 110, and 112 may represent embedded computing devices that transmit and receive information over a network (for example, 150). Some non-limiting examples of devices 102, 104, 106, 108, 110, and 112 may include a desktop computer, a notebook computer, a tablet computer, a thin client, a mobile device, a personal digital assistant (PDA), a phablet, a server, a printer, a network device, an automobile, a clock, a lock, a refrigerator, an enterprise security system, and a coffee maker. Devices 102, 104, 106, 108, 110, and 112 may each be a static device based at a fixed location or a mobile device whose location may keep on changing.

Devices 102, 104, 106, 108, 110, and 112 may each include a sensor(s). These sensor(s) may be used to detect events or changes in the environment of the respective devices, and then provide a corresponding output. The sensor(s) may provide various types of output, for example, an electrical signal or an optical signal. Some non-limiting examples of the sensor that may be present or embedded on devices 102, 104, 106, 108, 110, and 112 may each include a pressure sensor, a motion sensor, a light sensor, an infra-red sensor, a humidity sensor, a gas sensor, an acceleration sensor, a color sensor, and a gyro sensor. In an example, devices 102, 104, 106, 108, 110, and 112 may each include an actuator. Examples of the actuator may include an electric motor, hydraulic cylinder, a piezoelectric actuator, and a pneumatic actuator.

Devices 102, 104, 106, 108, 110, and 112 may be communicatively coupled, for example, via a network 150. In an example, the network may be an IoT network. Network 150 may be wireless (for example, a cellular network) or a wired network. The network may include, for example, a Local Area Network (LAN), a Wireless Local Area Network (WAN), a Metropolitan Area Network (MAN), a Storage Area Network (SAN), a Campus Area Network (CAN), or the like. Further, network 150e a public network (for example, the Internet) or a private network (for example, an intranet). Device 102, 104, 106, 108, 110, and 112 may use wired and/or wireless technologies for communication. Examples of wireless technologies may include Radio-frequency identification (RFID), Near-field Communication (NFC), optical tags, Bluetooth low energy (BLE), ZigBee, Thread, LTE-Advanced, and WiFi-Direct. Devices 102, 104, 106, 108, 110, and 112 may communicate data and/or signals with each other.

Devices 102, 104, 106, 108, 110, and 112 may use a data format for communication. Some non-limiting examples of the data format may include JSON (JavaScript Object Notation) and XML (extensible Markup Language).

Devices 102, 104, 106, 108, 110, and 112 may each be assigned a unique identifier. A unique identifier may be used to identify an associated device (for example, 102). In an example, the unique identifier may include an IP address (for example, an IPv4 address or an IPv6 address).

In an example, hub device 140 may represent any type of system capable of executing machine-readable instructions. Some non-limiting examples of hub device 140 may include a server, a desktop computer, a notebook computer, a tablet computer, a thin client, a mobile device, a personal digital assistant (PDA), and the like.

Devices 102, 104, 106, 108, 110, and 112 may each be in communication with hub device 140, for example, via a computer network. Such a computer network may be similar to the computer network described above.

In an example, hub device 140 may include a receipt engine 120, an analytics engine 122, a classification engine 124, a cluster engine 126, and a notification engine 128. Engines 120, 122, 124, 126, and 128 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of hub device 140. In some examples, the at least one machine-readable storage medium may store instructions that, when executed by the at least one processing resource, at least partially implement some or all engines of the computing device. In such examples, hub device 140 may include the at least one machine-readable storage medium storing the instructions and the at least one processing resource to execute the instructions.

Receipt engine 120 may receive data from a device(s) (for example, 102) in an IoT network. In an example, the data may be generated by a sensor(s). The sensor(s) may be present on the device(s) or communicatively coupled to the device(s). To provide an example, an IoT network for an oil company may comprise sensor devices to detect leakage and/or tampering in oil pipelines, sensor devices on container ships and container trucks, sensor devices on cranes for movement of containers, and a hub device to receive data transmitted by the aforementioned sensor devices.

Receipt engine 120 may convert the data into a common data format. Some non-limiting examples of the data format may include JSON (JavaScript Object Notation) and XML (Extensible Markup Language). Receipt engine 120 may communicate the data (or formatted data) to analytics engine 122.

Analytics engine 122 may analyze the data against a classification of previous data from devices (for example, 102, 104, 106, 108, 110, and 112) present in the IoT network. In an example, classification engine 124 may classify the previous data. In an example, the classification may occur as follows. Receipt engine 120 may receive the previous data from a device(s) (for example, 102, 104, 106, 108, 110, and 112) present in the IoT network. In an example, the previous data may be generated by a sensor(s). The sensor(s) may be present on the device(s) or communicatively coupled to the device(s). Receipt engine 120 may convent the previous data into a common data format, which may include, for example, JSON (JavaScript Object Notation) and XML (Extensible Markup Language). Receipt engine 120 may communicate the previous data (or formatted data) to classification engine 124.

Classification engine 124 may identify a feature(s) present in the previous data. Examples of the feature may include temperature, flow level, flow speed, latitude, and humidity. In an example, the feature(s) may be identified using Natural Language Processing (NLP). In another example, a user may define a feature to be identified by classification engine 124 via a user interface. Classification engine 124 may also extract a feature value of a feature from the previous data. For example, if "temperature" is the feature, a feature value may include temperature data in degree Celsius or Fahrenheit (e.g., 90°). Classification engine 124 may be used to discover association between the devices in the IoT network and/or determine hierarchy for relay of data amongst the devices. In an example, classification engine 124 may us an Ontology-based NLP technique to discover association between the devices in the IoT network and/or determine hierarchy. For example, an Ontology-based NLP technique may be used to convert chunks of previous data into more formal representations such as first-order logic structures that are easier for computer programs to manipulate. Natural language-based processing may help identify the intended semantic form the multiple possible semantics which may be derived from a natural language expression.

Figure 2:
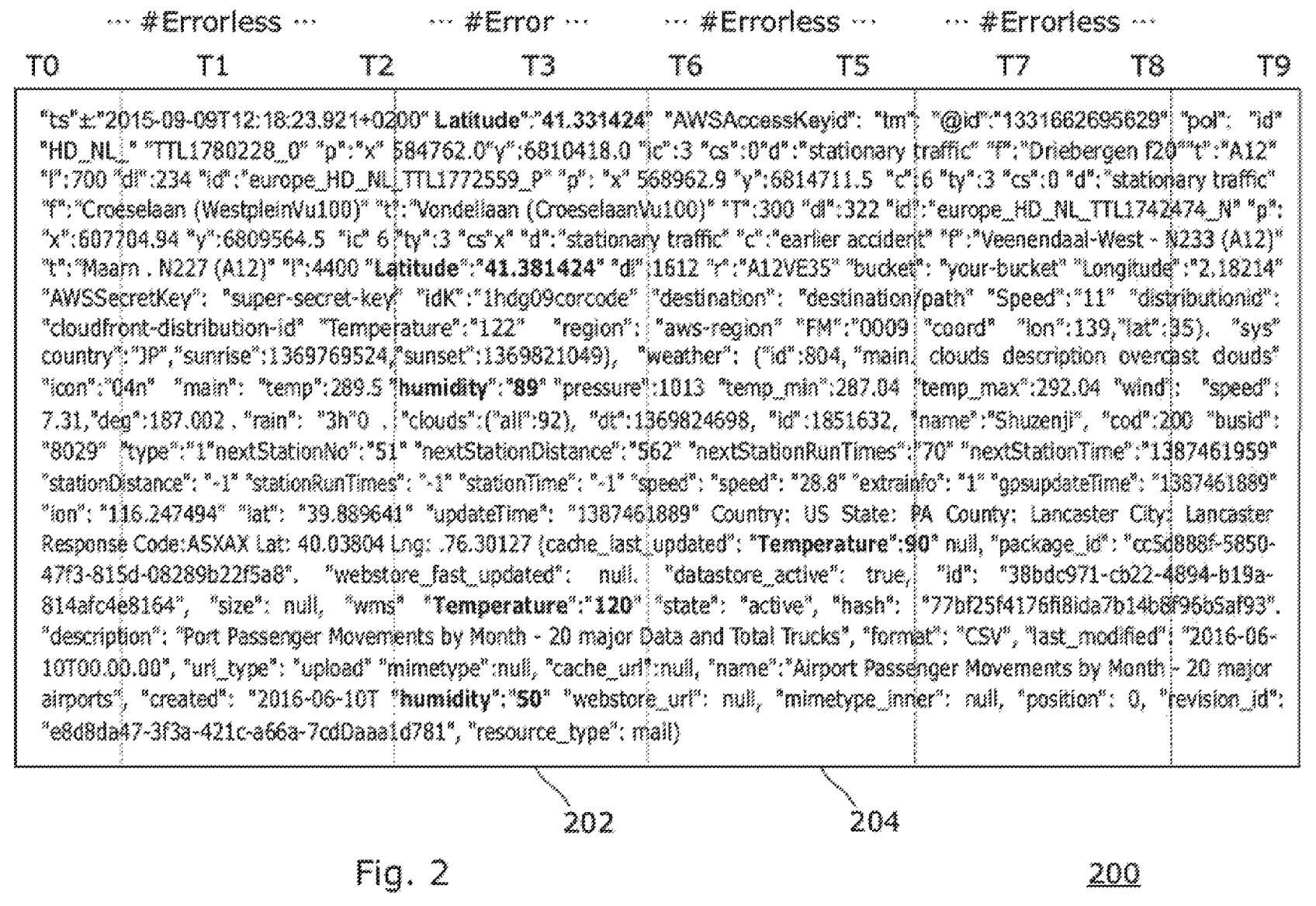

The previous data may be divided into a plurality of time slots based on a period of time. In an example, a user may time slice the previous data into a plurality of time slots based on a period of time. The period of time may include, for example, an hour, a week, a month, or a year. FIG. 2 illustrates an example time slicing of the previous data 200 into a plurality of time slots. For each time slot, classification engine 124 may determine the presence of a feature(s) identified earlier in the data present in a time slot. Classification engine 124 may compare the feature value of a feature identified earlier against a pre-defined value or range defined for the feature. If the feature value varies from the pre-defined value or range, classification engine 124 may identify the feature value as a "failed" value. As used herein, the variation may refer to a higher or lower value (or range) than a pre-defined value (or range). Classification engine 124 may perform such comparison for each of the features identified earlier against their respective pre-defined values or ranges.

Classification engine 124 may classify the time slots into two categories based on whether a time slot includes a feature with a failed feature value or not. For example, a time slot that includes a feature with a failed feature value may be classified as an "error time slot" (for example, 202), and a time slot that does not include a feature with a failed feature value may be classified as an "errorless time slot" (for example, 204).

Classification engine 124 may determine probability of data in a time slot being classified as one of the erroneous data, the potentially erroneous data, or the normal data based on feature difference across data present in "error time slots" and "errorless time slots". In an example, classification engine may use Naïve Bayes Classification for determining the probability. An example equation that uses Naïve Bayes Classification for determining the probability is given below.

$$\log(P(Y|X1,\ldots,Xn)) = \text{constant} + \Sigma|_{i=1}^{n} \log P(Xi|Y) + \log P(Y)$$

where X1 . . . N represents a set of features, and Y represents the class to be predicted. In an example, each of the device features may constitute a class in a Naïve Bayes Classification, which may be used to classify current device data as one of the erroneous data, the potentially erroneous data, or the normal data based on the previous data. For example, a potentially erroneous data may be identified out of each device's historical feature failure, which may be determined from the previous data. If data from a device contains a feature with high failure probability (using historical failure analysis) then the data may be identified as potential failure.

Classification engine 124 may identify devices that contributed data towards the error time slots from the previous data. Using features discovered with respect to each device configuration, classification engine may determine which contributing features are present across devices that contributed data towards the error time slots. Classification engine 124 may classify the previous data into various categories based on the determined probability. In an example, classification engine 124 may classify the previous data as one of an "erroneous data", a "potentially erroneous data", or a "normal data". As used herein, "erroneous data" may refer to data wherein each of the feature values of the identified features include failed values; "potentially erroneous data" may refer to data wherein some of the feature values of the identified features include failed values; and "normal data" may refer to data wherein none of the feature values of the identified features include failed values.

Figure 3:
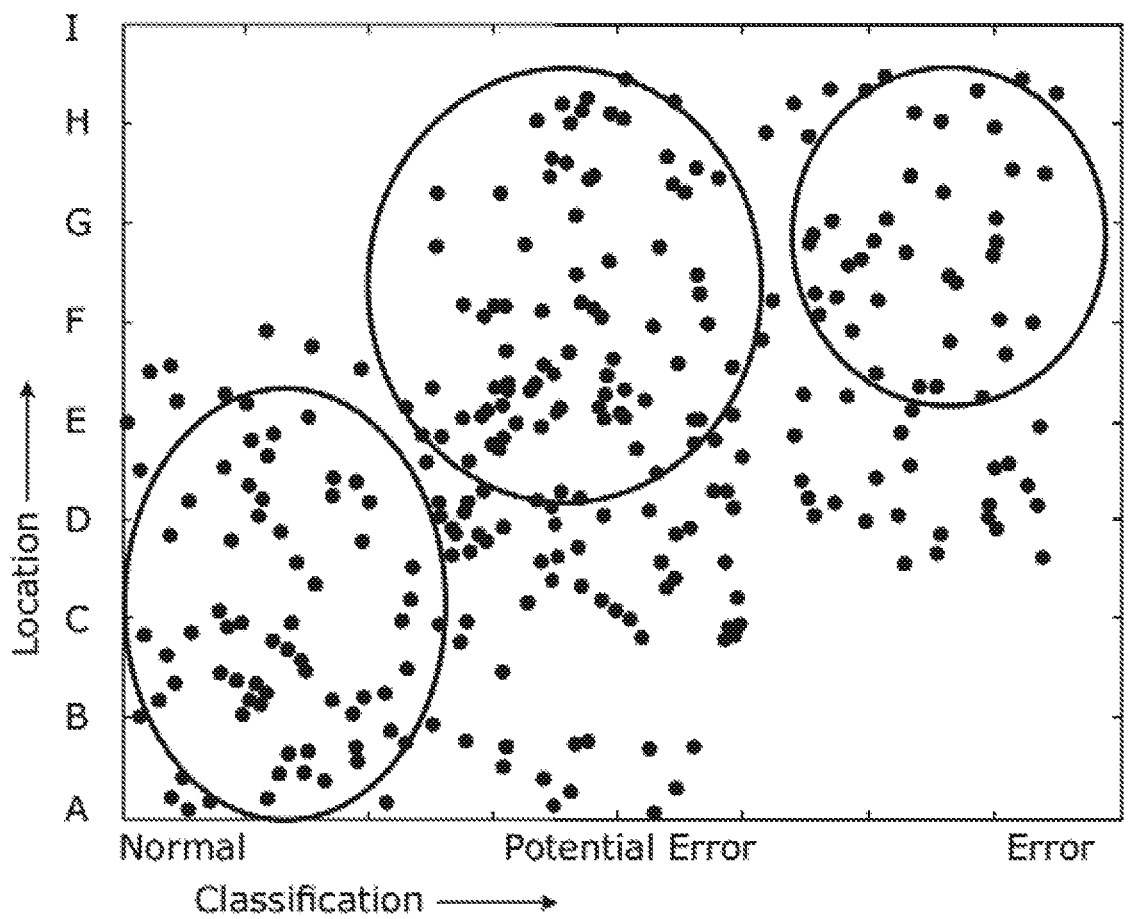
FIG. 3 shows an example clustering classification of devices in the IoT network of FIG. 1.

Post classification, cluster engine 126 may generate a cluster classification that correlates the devices based on their geographical locations and the classification assigned to their previous data (for example, "erroneous date", "potentially erroneous data", or "normal data"). FIG. 3 shows an example clustering classification of the devices based on their geographical locations and the classification assigned to their previous data. Cluster engine 1126 may classify the devices into various categories. In an example, the cluster classification may classify the devices into one of an "erroneous cluster", a "potentially erroneous cluster", or a "normal cluster". Clustering classification may help determine how a set of devices may be correlated based on feature classification and location. In the oil company example mentioned earlier, cluster classification may help correlate a truck (a device) and a loading crane (another device), which may fail together at a specific loading location for some hourly seasonality, for example, the loading crane may break down while adjusting to the truck's loading height.

Referring back to the role of analytics engine 122, analytics engine 122 may analyze the data received from a device (for example, 102) in the IoT network against the classification generated by classification engine. In an example, analytics engine 122 may analyze the data against the classification to determine whether the data is an erroneous data, a potentially erroneous data, or a normal data. In response to a determination by analytics engine 122 that the data from the device may represent erroneous data, analytics engine 122 may include the device in a set of potentially erroneous devices. Analytics engine 122 may proceed to determine a cluster of the device in the cluster classification generated by cluster engine 126. In an example, analytics 122 engine may determine whether the device belongs to an erroneous cluster, a potentially erroneous cluster, or a normal cluster. In response to a determination by analytics engine 122 that the device belongs to the erroneous cluster in the cluster classification, analytics engine may include associated devices in the erroneous cluster to the set of potentially erroneous devices.

In an example, in response to a determination by analytics engine 122 that the data from the device may represent potentially erroneous data, analytics engine 122 may analyze the potentially erroneous cluster in the cluster classification to perform a bottom-up and/or bottom-down analysis on a child and/or the parent device of the device. The analysis may help in determining how far an event error may propagate across a hierarchy of devices (for example, 102, 104, 106, 108, 110, and 112) in the IoT network.

To perform a bottom-up analysis, analytics engine 122 may analyze the parent device's data against the classification by classification engine. In an example, analytics engine 122 may analyze the parent device's data against the classification to determine whether the parent device's data is an erroneous data, a potentially erroneous data, or a normal data. In response to a determination by analytics engine 122 that the parent device's data may represent erroneous data, analytics engine may include the parent device in the set of potentially erroneous devices. Analytics engine 122 may determine a cluster of the parent device in the cluster classification. In response to a determination that the parent device belongs to the erroneous cluster, analytics engine 122 may include remaining devices in the cluster of the parent device in the set of potentially erroneous devices, wherein the remaining devices include devices in the cluster of the parent device other than the parent device.

To perform a bottom-down analysis, analytics engine 122 may analyze the data from each child device of the device against the classification by classification engine. In an example, analytics engine 122 may analyze a child device's data against the classification to determine whether the child device's data is an erroneous data, a potentially erroneous data, or a normal data. In response to a determination by analytics engine 122 that the child device's data may represent erroneous data, analytics engine 122 may include the child device in the set of potentially erroneous devices. Analytics engine 122 may determine a cluster of the child device in the cluster classification. In response to a determination that the child device belongs to the erroneous cluster, analytics engine 122 may include remaining devices in the cluster of the child device in the set of potentially erroneous devices, wherein the remaining devices include devices in the cluster of the child device other than the child device.

Analytics engine 122 may determine whether the threshold amount of devices in the set of potentially erroneous devices is higher than a pre-defined value. In an example, the threshold amount may represent a percentage of devices in the set compared to total number of devices in the IoT network. In response to a determination by analytics engine 122 that the threshold amount of devices in the set of potentially erroneous devices is higher than the pre-defined value, notification engine 128 may generate a notification. In an example, the notification may include generation of an alert in the IoT network. The alert may cause a system (for example, hub device) or a user to perform an action, for example, a corrective action.

Figure 4:
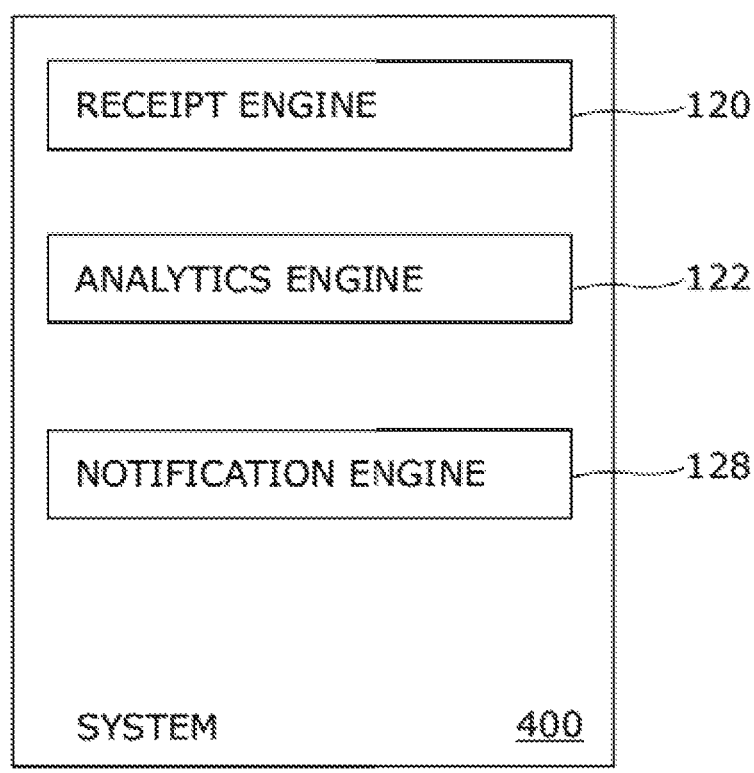
FIG. 4 is a block diagram of an example computing system for identifying a potentially erroneous device in an Internet of Things (IoT) network.

FIG. 4 is a block diagram of an example computing system 400 for identifying a potentially erroneous device in an Internet of Things (IoT) network. In an example, computing system 400 may be analogous to hub device 140 of FIG. 1, in which like reference numerals correspond to the same or similar, though perhaps not identical, components. For the sake of brevity, components or reference numerals of FIG. 4 having a same or similarly described function in FIG. 1 are not being described in connection with FIG. 4. Said components or reference numerals may be considered alike.

In an example, system 400 may represent any type of computing device capable of reading machine-executable instructions. Examples of the computing device may include, without limitation, a server, a desktop computer, a notebook computer, a tablet computer, a thin client, a mobile device, and a personal digital assistant (PDA).

In an example, system 400 may include a receipt engine 120, an analytics engine 122, and a notification engine 128.

In an example, receipt engine 120 may receive data from an IoT device in an IoT network comprising a plurality of IoT devices. Analytics engine 122 may analyze the data against a classification of previous data from the plurality of IoT devices, wherein the classification classifies the previous data as one of an erroneous data, a potentially erroneous data, or a normal data. In response to a determination that the data from the IoT device represents the erroneous data, analytics engine may include the IoT device in a set of potentially erroneous IoT devices.

Analytics engine 122 may determine a cluster of the IoT device in a cluster classification that correlates IoT devices in the plurality of IoT devices based on respective geographical locations of the IoT devices and respective classification of previous data from the IoT devices, wherein the cluster classification classifies the IoT devices into one of an erroneous cluster, a potentially erroneous cluster, or a normal cluster. In response to a determination that the IoT device belongs to the erroneous cluster in the cluster classification, analytics engine 122 may add associated IoT devices in the erroneous cluster to the set of potentially erroneous IoT devices.

On the other hand, in response to a determination that the data from the IoT device represents the potentially erroneous data, analytics engine 122 may determine the cluster of the IoT device in the cluster classification. Analytics engine 122 may perform a bottom-up analysis with respect to the IoT device based on a hierarchy of devices within the cluster to determine whether data from a parent device of the IoT device is one of the erroneous data, the potentially erroneous data, or the normal data. In response to a determination that the data from the parent device represents the erroneous data, analytics engine 122 may include the parent device in the set of potentially erroneous devices.

In response to a determination that a number of IoT devices in the set of potentially erroneous IoT devices is higher than a pre-defined value by analytics engine 122, notification engine 128 may generate a notification.

Figure 5:
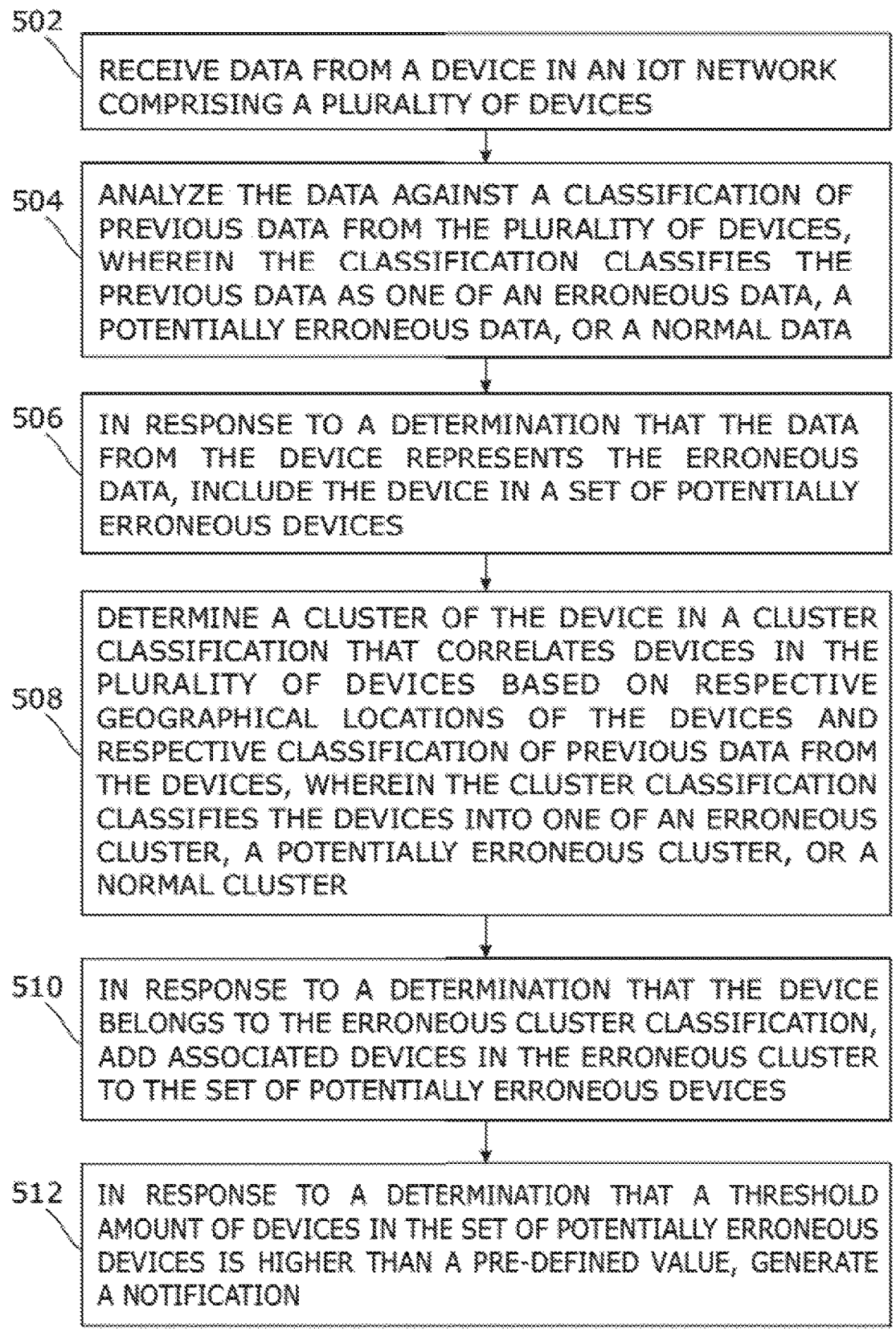
FIG. 5 is a flowchart of an example method of identifying a potentially erroneous device in an Internet of Things (IoT) network.

FIG. 5 is a flowchart of an example method 500 of identifying a potentially erroneous device in an Internet of Things (IoT) network. The method 500, which is described below, may be executed on a computing device such as hub device 140 of FIG. 1 or system 400 of FIG. 4. However, other computing devices may be used as well. At block 502, receipt engine 120 may receive data from a device in an IoT network comprising a plurality of devices. At block 504, analytics engine 122 may analyze the data against a classification of previous data from the plurality of devices, wherein the classification classifies the previous data as one of an erroneous data, a potentially erroneous data, or a normal data. At block 506, in response to a determination that the data from the device represents the erroneous data, analytics engine 122 may include the device in a set of potentially erroneous devices. At block 508, analytics engine 122 may determine a cluster of the device in a cluster classification that correlates devices in the plurality of devices based on respective geographical locations of the devices and respective classification of previous data from the devices, wherein the cluster classification classifies the devices into one of an erroneous cluster, a potentially erroneous cluster, or a normal cluster. At block 510, in response to a determination that the device belongs to the erroneous cluster in the cluster classification, analytics engine 122 may add associated devices in the erroneous cluster to the set of potentially erroneous devices. At block 512, in response to a determination by analytics engine 122 that a threshold amount of devices in the set of potentially erroneous devices is higher than a pre-defined value, notification engine 128 may generate a notification.

Figure 6:
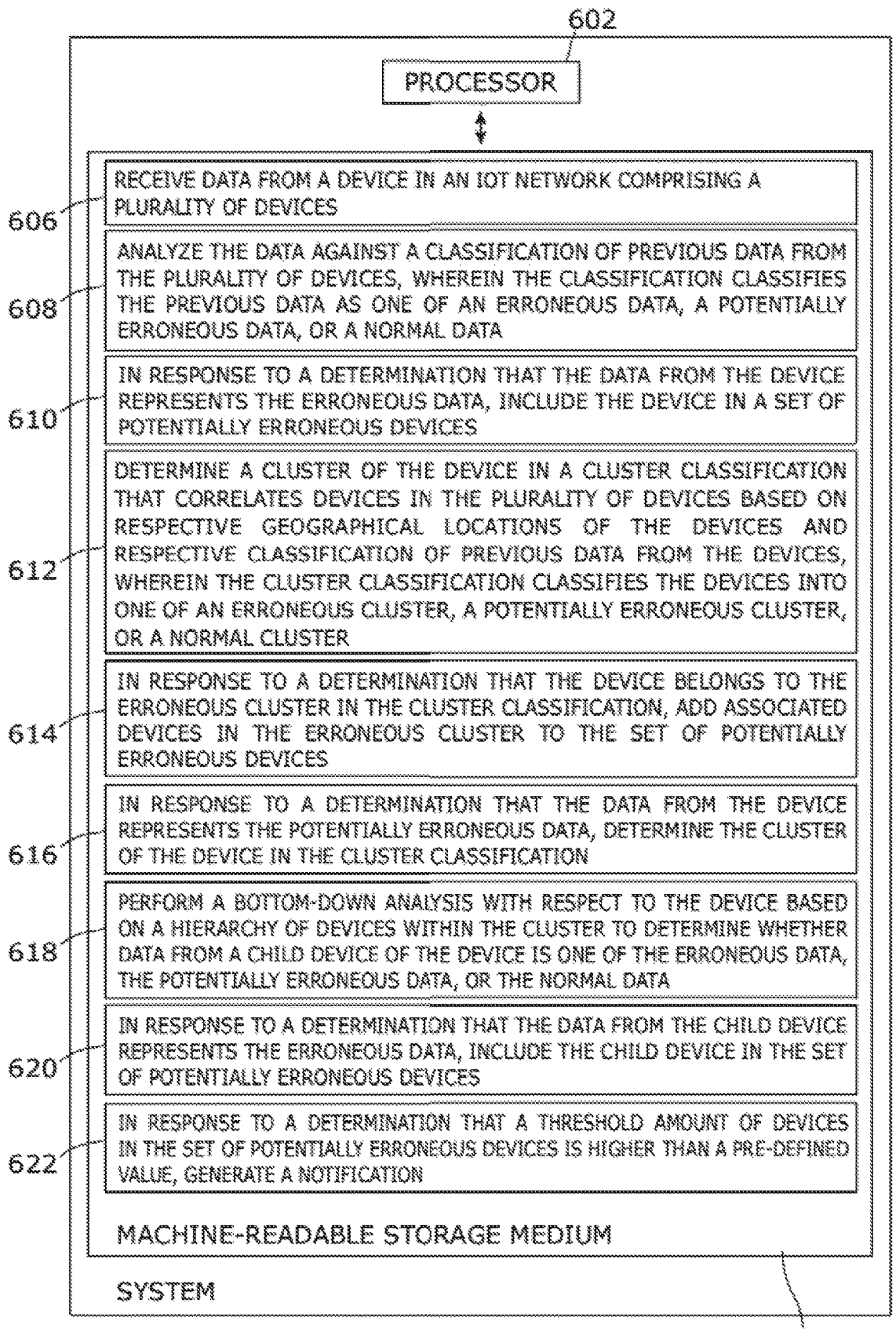
FIG. 6 is a block diagram of an example system including instructions in a machine-readable storage medium for identifying a potentially erroneous device in an Internet of Things (IoT) network.

FIG. 6 is a block diagram of an example system 600 for identifying a potentially erroneous device in an Internet of Things (IoT) network. System 600 includes a processor 602 and a machine-readable storage medium 604 communicatively coupled through a system bus. In some examples, system 600 may be analogous to hub device 140 of FIG. 1 or system 400 of FIG. 4. Processor 602 may be any type of Central Processing Unit (CPU), microprocessor, or processing logic that interprets and executes machine-readable instructions stored in machine-readable storage medium 606. Machine-readable storage medium 604 may be random access memory (RAM) or another type of dynamic storage device that may store information and machine-readable instructions that may be executed by processor 602. For example, machine-readable storage medium 604 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 604 may store instructions 606, 608, 610, 612, 614, 616, 618, 620, and 622. In an example, instructions 606 may be executed by processor 602 to receive data from a device in an IoT network comprising a plurality of devices. Instructions 608 may be executed by processor 602 to analyze the data against a classification of previous data from the plurality of devices, wherein the classification classifies the previous data as one of an erroneous data, a potentially erroneous data, or a normal data. Instructions 610 may be executed by processor 602 to include the device in a set of potentially erroneous devices in response to a determination that the data from the device represents the erroneous data.

Instructions 612 may be executed by processor 402 to determine a cluster of the device in a cluster classification that correlates devices in the plurality of devices based on respective geographical locations of the devices and respective classification of previous data from the devices, wherein the cluster classification classifies the deices into one of an erroneous cluster, a potentially erroneous cluster, or a normal cluster. Instructions 614 may be executed by processor 402 to add associated devices in the erroneous cluster to the set of potentially erroneous devices in response to a determination that the device belongs to the erroneous cluster in the cluster classification.

Instructions 616 may be executed by processor 402 to determine the cluster of the device in the cluster classification in response to a determination that the data from the device represents the potentially erroneous data. Instructions 618 may be executed by processor 402 to perform a bottom-down analysis with respect to the device based on a hierarchy of devices within the cluster to determine whether data from a child device of the device is one of the erroneous data, the potentially erroneous data, or the normal data. Instructions 620 may be executed by processor 402 to include the child device in the set of potentially erroneous devices in response to a determination that the data from the child device represents the erroneous data.

Instructions 622 may be executed by processor 402 to generate a notification in response to a determination that a threshold amount of devices in the set of potentially erroneous devices is higher than a pre-defined value.

For the purpose of simplicity of explanation, the example method of FIG. 5 is shown as executing serially, however it is to be understood and appreciated that the present and other examples are not limited by the illustrated order. The example systems of FIGS. 1, 4, and 6, and method of FIG. 5 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

We claim:

1. A method comprising:
by a processor:
receiving data from a device in an Internet of Things (IoT) network comprising a plurality of devices;
analyzing the data against a classification of previous data from the plurality of devices, wherein the classification classifies the previous data as one of an erroneous data, a potentially erroneous data, or a normal data;
in response to a determination that the data from the device represents the erroneous data, including the device in a set of potentially erroneous devices;
determining a cluster of the device in a cluster classification that correlates devices in the plurality of devices based on respective geographical locations of the devices and respective classification of previous data from the devices, wherein the cluster classification classifies the devices into one of an erroneous cluster, a potentially erroneous cluster, or a normal cluster;
in response to a determination that the device belongs to the erroneous cluster in the cluster classification, adding associated devices in the erroneous cluster to the set of potentially erroneous devices;
in response to a determination that a threshold amount of devices in the set of potentially erroneous devices is higher than a pre-defined value, generating a notification and
generating the classification of the previous data from the plurality of IoT devices, wherein the generation comprises:
converting the previous data into a common format;
identifying features from the previous data;
time slicing the previous data into a plurality of time slots;
identifying time slots in the plurality of time slots that include a feature from the identified features with a feature value that varies from a pre-defined value;
classifying the time slots as error time slots;
classifying remaining time slots in the plurality of time slots as errorless time slots, the remaining slots including time slots other than the error time slots;
determining probability of data in a time slot classified as one of the erroneous data, the potentially erroneous data, or the normal data based on feature difference across data present in the error time slots and errorless time slots; and
classifying the data in the time slot as one of the erroneous data, the potentially erroneous data, or the normal data based on the probability.

2. The method of claim 1, wherein the threshold amount includes a percentage of the devices in the set of potentially erroneous devices compared to a total number of the devices in the IoT network.

3. The method of claim 1, wherein the device includes one of a mobile device or a static device.

4. The method of claim 1, wherein the probability of data in the time slot classified as one of the erroneous data, the potentially erroneous data, or the normal data is determined using a Naïve Bayes classification.

5. The method of claim 1, wherein the common format includes a JavaScript Object Notation (JSON) format.

6. The method of claim 1, wherein the feature includes at least one of respective device IDs of the IoT devices, respective parent IDs of the IoT devices, a timestamp, respective geographical locations of the IoT devices, or a message payload.

7. A system comprising:
a receipt engine to receive data from an Internet of Things (IoT) device in an IoT network comprising a plurality of IoT devices;
an analytics engine to:
analyze the data against a classification of previous data from the plurality of IoT devices, wherein the classification classifies the previous data as one of an erroneous data, a potentially erroneous data, or a normal data;
in response to a determination that the data from the IoT device represents the erroneous data, include the IoT device in a set of potentially erroneous IoT devices;
determine a cluster of the IoT device in a cluster classification that correlates IoT devices in the plurality of IoT devices based on respective geographical locations of the IoT devices and respective classification of previous data from the IoT devices, wherein the cluster classification classifies the IoT devices into one of an erroneous cluster, a potentially erroneous cluster, or a normal cluster;

in response to a determination that the IoT device belongs to the erroneous cluster in the cluster classification, add associated IoT devices in the erroneous cluster to the set of potentially erroneous IoT devices;

in response to a determination that the data from the IoT device represents the potentially erroneous data, determine the cluster of the IoT device in the cluster classification;

perform a bottom-up analysis with respect to the IoT device based on a hierarchy of devices within the cluster to determine whether data from a parent device of the IoT device is one of the erroneous data, the potentially erroneous data, or the normal data; and in response to a determination that the data from the parent device represents the erroneous data, include the parent device in the set of potentially erroneous devices;

a notification engine to, in response to a determination that a threshold amount of IoT devices in the set of potentially erroneous IoT devices is higher than a pre-defined value, generate a notification; and a classification engine to generate the classification of the previous data from the plurality of IoT devices, wherein the generation comprises:

converting the previous data into a common format;
identifying features from the previous data;
time slicing the previous data into a plurality of time slots;
identifying time slots in the plurality of time slots that include a feature from the identified features with a feature value that varies from a pre-defined value;
classifying the time slots as error time slots;
classifying remaining time slots in the plurality of time slots as errorless time slots, the remaining slots including time slots other than the error time slots;
determining probability of data in a time slot classified as one of the erroneous data, the potentially erroneous data, or the normal data based on feature difference across data present in the error time slots and errorless time slots; and
classifying the data in the time slot as one of the erroneous data, the potentially erroneous data, or the normal data based on the probability.

8. The system of claim 7, wherein the probability of data in the time slot classified as one of the erroneous data, the potentially erroneous data, or the normal data is determined using a Naïve Bayes classification.

9. The system of claim 7, wherein the common format includes a JavaScript Object Notation (JSON) format.

10. The system of claim 7, wherein the feature includes at least one of respective device IDs of the IoT devices, respective parent IDs of the IoT devices, a timestamp, respective geographical locations of the IoT devices, or a message payload.

11. The system of claim 7, further comprising:
a cluster engine to generate the cluster classification that correlates the IoT devices in the plurality of IoT devices based on respective geographical locations of the IoT devices and respective classification of the previous data from the IoT devices.

12. The system of claim 7, wherein the threshold amount includes a percentage of the devices in the set of potentially erroneous devices compared to a total number of the devices in the IoT network.

13. The system of claim 7, wherein the device includes one of a mobile device or a static device.

14. A non-transitory machine-readable storage medium comprising instructions, the instructions executable by a processor to:

receive data from a device in an Internet of Things (IoT) network comprising a plurality of devices;

analyze the data against a classification of previous data from the plurality of devices, wherein the classification classifies the previous data as one of an erroneous data, a potentially erroneous data, or a normal data;

in response to a determination that the data from the device represents the erroneous data, include the device in a set of potentially erroneous devices;

determine a cluster of the device in a cluster classification that correlates devices in the plurality of devices based on respective geographical locations of the devices and respective classification of previous data from the devices, wherein the cluster classification classifies the devices into one of an erroneous cluster, a potentially erroneous cluster, or a normal cluster;

in response to a determination that the device belongs to the erroneous cluster in the cluster classification, add associated devices in the erroneous cluster to the set of potentially erroneous devices;

in response to a determination that the data from the device represents the potentially erroneous data, determine the cluster of the device in the cluster classification;

perform a bottom-down analysis with respect to the device based on a hierarchy of devices within the cluster to determine whether data from a child device of the device is one of the erroneous data, the potentially erroneous data, or the normal data; and in response to a determination that the data from the child device represents the erroneous data, include the child device in the set of potentially erroneous devices;

in response to a determination that a threshold amount of devices in the set of potentially erroneous devices is higher than a pre-defined value, generate a notification; and in response to a determination that the data from the device represents the potentially erroneous data, determine the cluster of the device in the cluster classification;

perform a bottom-up analysis with respect to the device based on a hierarchy of devices within the cluster to determine whether data from a parent device of the device is one of the erroneous data, the potentially erroneous data, or the normal data;

in response to a determination that the data from the parent device represents the erroneous data, include the parent device in the set of potentially erroneous devices;

determine a cluster of the parent device in the cluster classification; and in response to a determination that the parent device belongs to the erroneous cluster, include remaining devices in the cluster of the parent device in the set of potentially erroneous devices, wherein the remaining devices include devices in the cluster of the parent device other than the parent device.

15. The storage medium of claim 14, further comprising instructions to: generate the hierarchy of devices within the cluster using an Ontology-based Natural Language Processing (NLP) technique.

16. The storage medium of claim 14, further comprising instructions to:
   in response to a determination that the data from the device represents the potentially erroneous data, determine the cluster of the device in the cluster classification;
   perform a bottom-down analysis with respect to the device based on a hierarchy of devices within the cluster to determine whether data from a child device of the device is one of the erroneous data, the potentially erroneous data, or the normal data; and
   in response to a determination that the data from the child device represents the erroneous data, include the child device in the set of potentially erroneous devices.

17. The storage medium of claim 16, further comprising instructions to:
   determine a cluster of the child device in the cluster classification; and
   in response to a determination that the child device belongs to the erroneous cluster, include remaining devices in the cluster of the child device in the set of potentially erroneous devices, wherein the remaining devices include devices in the cluster of the child device other than the child device.

18. The storage medium of claim 14, wherein the threshold amount includes a percentage of the devices in the set of potentially erroneous devices compared to a total number of the devices in the IoT network.

19. The storage medium of claim 14, wherein the device includes one of a mobile device or a static device.

* * * * *